May 26, 1964  L. C. BROYLES  3,134,411
ROUTER ATTACHMENT FOR TABLE SAWS
Filed June 29, 1961  2 Sheets-Sheet 1

INVENTOR
Louis C. Broyles

BY

ATTORNEY

May 26, 1964

L. C. BROYLES 3,134,411

ROUTER ATTACHMENT FOR TABLE SAWS

Filed June 29, 1961

INVENTOR
Louis C. Broyles

BY

ATTORNEY

United States Patent Office 3,134,411
Patented May 26, 1964

3,134,411
ROUTER ATTACHMENT FOR TABLE SAWS
Louis C. Broyles, Dallas, Tex.
(1139 Caldwell St., Garland, Tex.)
Filed June 29, 1961, Ser. No. 120,671
4 Claims. (Cl. 144—134)

This invention relates generally to powered woodworking tools, and it has particular reference to a router and shaper attachment for table type circular saws, and its principal object resides in the provision of a compact unit adapted to be installed in a saw table and driven by the horizontal saw shaft to transmit rotation thereby to a vertical shaft extending through the table top and having a router or shaper blade attached thereto.

An important object of the invention resides in the provision of a self-contained unit having a sealed housing adapted to contain a gear assembly and bearings, and readily removable to be replaced by a saw blade, when desirable, and without altering the saw table or its appurtenances, and without requiring special tools.

Conventional circular saw tables are adapted to be tilted to different angles from a horizontal plane, as desired, and the saw is mounted on a normally horizontal shaft, parallel to the plane of the table, and extends through an oblong opening in the table top which is partially closed by a slotted plate through which the saw blade operates. The saw, with its shaft, is also capable of vertical adjustment to vary the depth of cut of the saw blade and, when it is desirable to change the blade, the saw and its housing or pocket can be tilted or rotated on its shaft to gain access to the nut securing the saw blade thereto.

Broadly, therefore, the invention contemplates the provision of a simple and economical router assembly which can be readily applied to the saw shaft to convert the tool to a router.

While the foregoing objects are paramount, other and lesser objects will become manifest as the description proceeds, taken in connection with the appended drawings wherein.

Figure 2:
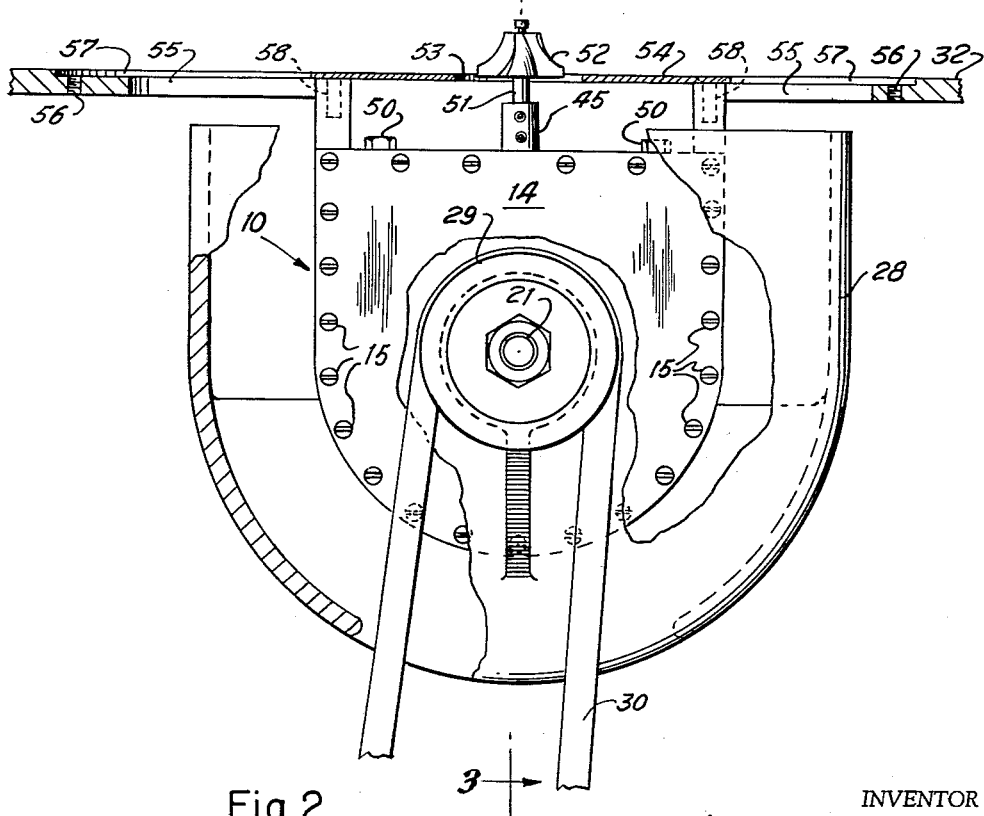
FIGURE 2 is a side elevational view of the invention, on lines 2—2 of FIGURE 1, supported by its supporting plate in the table top, shown in fragmentary section, the saw housing being shown partially in section.
Figure 3:
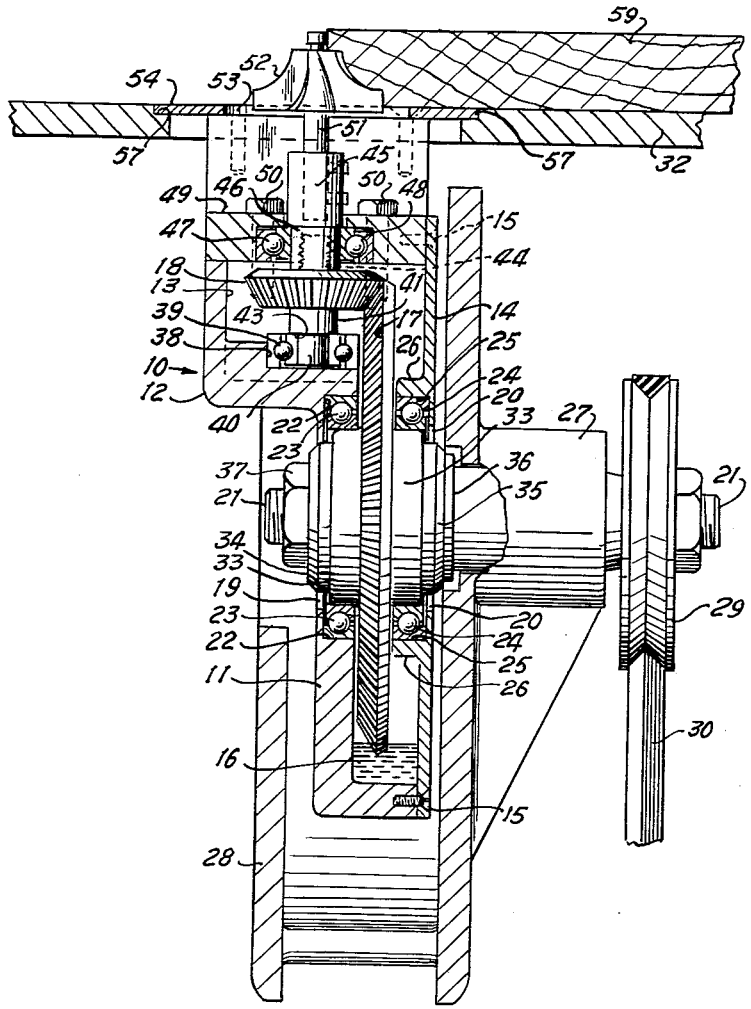
FIGURE 3 is a transverse sectional view of the invention, on lines 3—3 of FIGURE 2, showing the ring gear and pinion in the sealed housing, the ring gear being shown attached to the saw shaft.

The invention is enclosed within a housing 10 whose lower end portion is semi-circular, as shown in FIGURE 2, and consists of a casting 11 formed with an offset portion 12 at its upper end, as apparent in FIGURE 3, to define a chamber 13 when a cover plate 14 is attached to the open side of the casting 11 by screws 15, or other suitable device. The semi-circular closed lower portion is adapted to contain a quantity of oil 16 as a lubricant for the gear 17 and pinion 18 operating therein.

Annular openings 19 and 20 are provided centrally of the casting 11 and the cover plate 14 through which the shaft 21 of the circular saw can extend, as shown in FIGURE 3. An annular recess 22 is formed about the opening 19 in the casting 11 to receive the outer race of a non-friction bearing 23, another similar bearing 24 being arranged opposite thereto and having its outer race received in a recess 25 defined by a circular boss 26 formed about the opening 20 in the cover plate 14.

Figure 4:
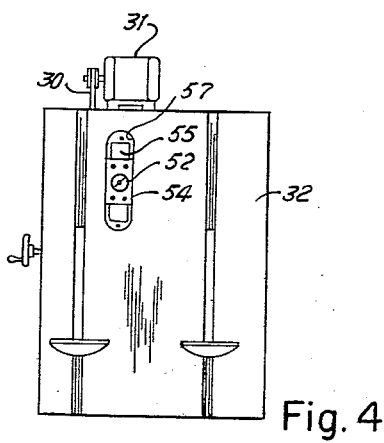
FIGURE 4 is a plan view of a saw table on which the invention is mounted.

The saw shaft 21 is journalled in a boss 27 formed on one wall of the saw housing or pocket 28 which is supported on the table frame (not shown) and has a V-pulley 29 on its outer end about which a V-belt 30 is arranged to drive the shaft 21 by a motor 31 which is also mounted on a portion of the frame below the table 32, as shown in FIGURE 4.

A ring gear 17 is mounted on the saw shaft 21 within the housing 10 and has a hub 33 which is secured between a pair of washers 34 and 35. The outer washer 35 bears against an annular shoulder at 36 on the shaft 21 while the inner washer 34 is secured by a nut 37 threaded on the shaft 21, as illustrated in FIGURE 3. The inner races of the bearings 23 and 24 embrace the opposing extensions of the hub 33.

Formed in the chamber 13 is a receptacle 38 for a non-friction bearing 39 whose axis is in a vertical plane and provides a journal for the spindle 40 formed on the lower portion of the hub 41 of the pinion 18 which is meshed with the ring gear 17. The hub 41 of the pinion 18, on whose lower portion the spindle 40 is formed, has an annular shoulder 43 which is supported on the inner race of the bearing 39, as shown in FIGURE 3.

A threaded spindle 44, shown in dotted lines in FIGURE 3, is formed with the hub of the pinion 18 on which a chuck 45 is threaded, a reduced portion 46 of the hub being seated in the inner race of a non-friction bearing 47 whose outer race is seated in an annular recess 48 formed in the undersurface of a closure plate 49 for the housing 10, the plate 49 being secured to the housing 10 by stud bolts 50. The chuck 45 is adapted to detachably receive the shank 51 of a router or shaper tool 52 which projects above the surface of the table 32 through an opening 53 in a supporting plate 54, in the manner shown in FIGURES 2 and 3.

Figure 1:
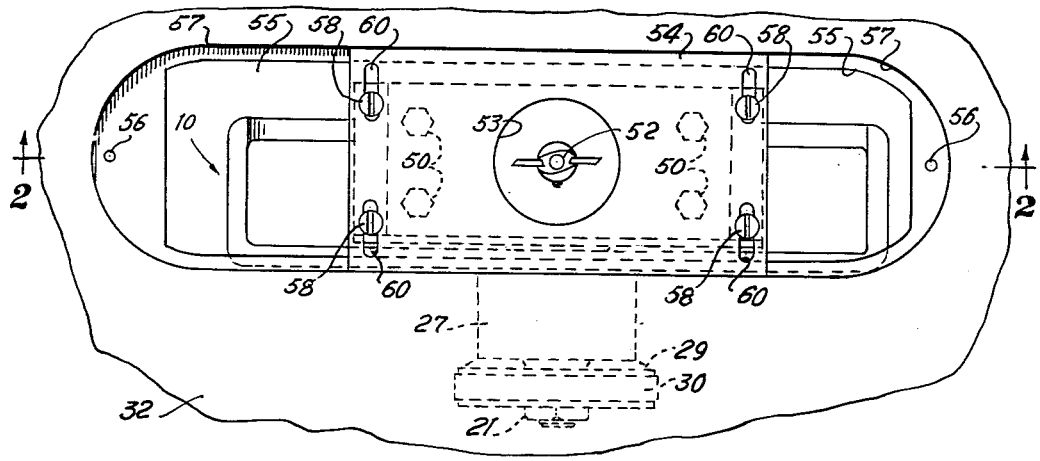
FIGURE 1 is a fragmentary plan view of a saw table top showing the opening therein through which the invention is suspended, and showing the supporting plate therefor.

The conventional saw table is provided with an elongated opening 55 through which the circular saw blade operates. Such opening 55 is usually fitted with a slotted plate through which the saw blade extends, and which is secured at each end by screws threaded into tapped holes 56 in each end of the opening 55 which is recessed at 57 about its perimeter, as shown in FIGURES 1, 2 and 3. It is contemplated that the plate 54, which is secured by screws 58 to the top of the housing 10, be shorter than the opening 55, as illustrated in FIGURE 1, to provide an open area at each end of the opening 55 through which the cuttings from the work 59, shown in cross-section in FIGURE 3, can be dropped. The screws 58 are arranged through slots 60 in the plate 54.

The unit embodying the invention is supported in operative position solely by the plate 54 and can be removed from the shaft 21 by first elevating the assembly in the usual manner by operating the crank wheel 61 arranged on one side of the frame, as shown in FIGURE 4, and by tilting the assembly on its pivot on the shaft 21 to gain access to the nut 37 through the opening 55 in the table 32. The housing 10 is relatively thin and is capable of being disposed within the saw pocket 28, as shown in FIGURE 3.

The invention is capable of being modified in structure and design without departing from the spirit and intent of the invention or the scope of the appended claims.

What is claimed is:

1. In a router attachment for table type circular saws, in combination with a saw table having a saw slot, a saw pocket below said table having a shaft therein for a saw blade and means for driving the same, a unitary assembly comprising a housing adapted to be suspended in said saw slot and into said saw pocket and having a chamber formed in the upper portion thereof, a ring gear rotatively arranged in said housing having a hub member journaled in the opposing walls thereof and capable of rigid attachment to said saw shaft, a pinion in said chamber having its axis disposed at right angles to the axis of said shaft and meshed with said ring gear to be rotated thereby, a chuck secured to said pinion and a router blade secured by said chuck in operative position above said work table.

2. In a router attachment for a saw table having a saw pocket depending therebelow and a driven shaft for a circular saw journalled in said saw pocket, in combination, a unit comprising a housing adapted to be supported in an opening in said table and suspended therebelow into said saw pocket and embrace said driven saw shaft, the upper portion of said housing being offset and defining a chamber, a ring gear having a hub journaled in the walls of said housing and attachable to said shaft, for rotation thereby, a pinion rotatably mounted in said chamber in the upper portion of said housing and having its axis transverse to the axis of said ring gear, the said pinion being meshed with said ring gear and driven thereby, a vertical shaft driven by said pinion and a router blade secured to said vertical shaft and rotatable thereby in a horizontal plane above the surface of said table.

3. In a router attachment for a circular saw table having a driven saw shaft rotatable in a horizontal plane below said table, the said shaft being journalled in a saw pocket supported under said table, in combination, a unitary structure comprising, a housing adapted to be supported by said table and depend therebelow into said saw pocket, the said housing having an offset chamber in the upper portion thereof, a ring gear having a hub member journaled in the walls of said housing capable of attachment to said saw shaft when the housing is passed over said shaft, a pinion rotatively mounted in the chamber in the upper portion of said housing and meshed with said ring gear and rotated thereby in a horizontal plane, and a router blade attached to said pinion and rotatable thereby above the surface of said table.

4. In a router attachment for a circular saw table having a saw slot therein, a saw pocket in said table depending below said slot, and a driven saw shaft in said saw pocket, in combination, a unit comprising a housing supported in said saw slot and depending into said saw pocket below said table and embracing said saw shaft, a ring gear having a hub member journaled in said housing for rotation in a vertical plane and having means for attachment to said saw shaft in said saw pocket, a vertical shaft in the upper portion of said housing extending through said saw slot and above said table and having a shaper tool attached to its upper end, and a beveled pinion on said vertical shaft having driven connection with said ring gear.

References Cited in the file of this patent
UNITED STATES PATENTS

| | | |
|---|---|---|
| 2,038,810 | Tautz | Apr. 28, 1936 |
| 2,615,479 | Bearup | Oct. 28, 1952 |
| 2,892,475 | Lapsley | June 30, 1959 |